US007877602B2

(12) United States Patent
French et al.

(10) Patent No.: US 7,877,602 B2
(45) Date of Patent: Jan. 25, 2011

(54) TRANSPARENT AWARE DATA TRANSFORMATION AT FILE SYSTEM LEVEL FOR EFFICIENT ENCRYPTION AND INTEGRITY VALIDATION OF NETWORK FILES

(75) Inventors: Steven Michael French, Austin, TX (US); Michael Austin Halcrow, Pflugerville, TX (US); Prasad Venkata Potluri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 850 days.

(21) Appl. No.: 11/829,132

(22) Filed: Jul. 27, 2007

(65) Prior Publication Data

US 2009/0031128 A1 Jan. 29, 2009

(51) Int. Cl.
*H04L 29/06* (2006.01)
(52) U.S. Cl. ................... 713/163; 713/162; 713/150
(58) Field of Classification Search ............... 713/163, 713/162, 150
See application file for complete search history.

(56) References Cited

U.S. PATENT DOCUMENTS

| | | | |
|---|---|---|---|
| 6,128,737 | A | 10/2000 | Jakubowski et al. |
| 6,199,162 | B1 | 3/2001 | Luyster |
| 6,226,742 | B1 | 5/2001 | Jakubowski et al. |
| 6,523,022 | B1 | 2/2003 | Hobbs |
| 6,868,495 | B1 * | 3/2005 | Glover ................ 713/190 |
| 6,986,043 | B2 | 1/2006 | Andrew et al. |
| 7,580,919 | B1 * | 8/2009 | Hannel et al. ......... 707/999.003 |

OTHER PUBLICATIONS

A Next Generation CIFS Client; Steven French; Linux Technology Center; IBM Austin Connectathon 2002 Mar. 5, 2002.*
Halcrow, M. 2005. eCryptfs: An enterprise-class cryptographic filesystem for Linux. In Proceedings of the Linux Symposium. vol. 1, 201-218; year 2005.*
IBM Linux Technology Center Library, web page, as printed out in year 2010.*
A cross-layer key management scheme in Ad hoc network ; , Zeng-Ping; , Hu-Ronglei; , Yang-Yatao; , Song-Jie; Signal Processing Systems (ICSPS), 2010 2nd International Conference on vol. 1 ; Publication Year: 2010 , pp. V1-132-V1-137.*

(Continued)

*Primary Examiner*—David Y Jung
(74) *Attorney, Agent, or Firm*—Yee & Associates, P.C.; Steven L. Bennett

(57) ABSTRACT

A mechanism for enabling efficient encryption and integrity validation of network files. When a request to read a file stored in a local network file system is received, the local network file system examines cryptographic attributes associated with the file to determine if the file is encrypted or integrity-verified. If the cryptographic attributes indicate the file is encrypted, the local network file system omits the encryption of the file by the local network file system prior to passing the file to the remote network file system. If the cryptographic attributes indicate the file is integrity-verified, the local network file system omits the integrity-verification of the file by the local network file system prior to passing the file to the remote network file system. The local network file system then transmits the file to the remote network file system.

20 Claims, 4 Drawing Sheets

OTHER PUBLICATIONS

Kubiatowicz et al., "OceanStore: An Architecture for Global-Scale Persistent Storage", ACM 2000, ASPLOS 2000, Cambridge MA, Nov. 12-15, 2000, pp. 190-201.

Pang et al., "A High-level Programming Environment for Packet Trace Anonymization and Transformation", ACM 2003, SIGCOMM'03, Aug. 25-29, 2003, Karlsruhe, Germany, pp. 339-351.

Hadzic et al., "Balancing Performance and Flexibility with Hardware Support for Network Architectures", ACM Transactions on Computer Systems, vol. 21, Issue 4, Nov. 2003, pp. 375-411.

Blaze, "A Cryptographic File system for Unix", ACM Conference on Communications and computing Security, Fairfax VA, Nov. 1993, pp. 1-8. http://www.crypto.com/papers/cfs.pdf.

Halcrow, "eCryptfs: A Stacked Cryptographic Filesystem*", May 1, 2007, pp. 1-10, retrieved Dec. 16, 2008 http://ecryptfs.sourceforge.net/ecryptfs-article.pdf.

* cited by examiner

TRANSPARENT AWARE DATA TRANSFORMATION AT FILE SYSTEM LEVEL FOR EFFICIENT ENCRYPTION AND INTEGRITY VALIDATION OF NETWORK FILES

BACKGROUND OF THE INVENTION

1. Field of the Invention

The present invention relates generally to an improved data processing system, and in particular to a computer implemented method, data processing system, and computer program product for providing transparent aware data transformation at the file system level to enable efficient encryption and integrity validation of network files.

2. Description of the Related Art

Most data processing systems contain sensitive data and sensitive operations that need to be protected. Secure data communication is essential in a wide range of businesses, including, but not limited to, banking, e-commerce, on-line stock trading, business-to-business transactions, and so forth. With the spread of networks and connectivity to the Internet, proper handling of confidential information has become increasingly important to prevent accidental interception of confidential information by an unauthorized recipient. Companies typically have policies in place as to designations and handling of confidential information. For example, encryption of all files containing confidential information may be required for transfer of files outside of a company's network or outside of selected computers.

Cryptography plays a pivotal role in various solutions offered for meeting challenges of confidentiality and security. Cryptography comprises a family of technologies. Two of these technologies are encryption and decryption. Encryption is A process of encoding data to prevent unauthorized access, especially during transmission of the data. Encryption uses a key that is required for decoding. Encryption ensures privacy by transforming data into a form that cannot be decrypted without the encryption key. Decryption is the reverse of encryption. Decryption uses the encryption key to transform encrypted data back into the original form.

One encryption scheme is Secure Sockets Layer (SSL). This standard is a widely used security protocol on the Internet. SSL ensures sensitive files are protected when transferred between a server and a client using a technique called "public key cryptography". With public key encryption, an asymmetric scheme is employed that uses a pair of keys for encryption. Public key cryptography involves providing each person a pair of keys, a public key and a secret key. The public key is published typically while the secret key is kept secret. The public key encrypts the data and a corresponding secret key decrypts the data.

A secret key is another key used in the public key encryption. The user typically keeps the secret key secret and uses it to encrypt digital signatures and decrypt received messages. Types of public key encryption include Rivest-Shamir-Adleman (RSA) encryption, which is a public key encryption algorithm on which programs, such as Pretty Good Privacy (PGP) encryption program, is based. Another encryption technology is Diffie-Hellman (DH) encryption, which is a commonly used key exchange protocol.

Encryption is also used for protecting files while they are in storage. For example, a user may wish to encrypt files on a hard disk to prevent an intruder or other unauthorized person from reading or accessing the files. Thus, encryption may transform data into a form undecipherable by anyone without a secret decryption key.

In this manner, encryption allows for secure communication over an insecure channel. However, the traditional techniques for encrypting and decrypting data over an insecure network connection before and after the data transfer using IP Security (IPSec) or Secure Sockets Layer (SSL) connections are computationally expensive. Since it may be expensive to alter existing client file system implementations, it is often feasible to stack an encryption file system or filter driver over an existing Network File System (NFS), Common Internet File System (CIFS), or General Parallel File System (GPFS) client. Encryption file systems allow for encrypting entire file systems or subsets of file systems. Since encryption file systems, such as Cryptographic File System (CFS) and eCryptfs, store the files in encrypted form on disk, it is not necessary to re-encrypt the files before transferring them to a server. In fact, for some cryptographic ciphers, encrypting data twice with the same cipher and the same key may weaken the level of security provided by the encryption.

However, there are four key problems to address in stacking an encryption layer on top of existing network file systems. A first problem is serializing access across multiple client implementations of the cryptographic file system layer working on the same inode. A second problem is making the server decide based on the user and client type whether to encrypt all traffic containing decrypted file data or not to encrypt the network file system traffic encrypted file data. A third problem is maintaining a consistent view of the key store (and the associated universally unique identifiers (UUIDs)) on the client and server. A fourth problem is having the cryptographic file system detect and use a more optimal performance configuration, such as read and write block sizes, when transferring data over a network file system.

SUMMARY OF THE INVENTION

The illustrative embodiments provide a computer implemented method, data processing system, and computer program product for providing transparent aware data transformation at the file system level to enable efficient encryption and integrity validation of network files. When a request is received by a local network file system from a remote network file system to read a file stored in the local network file system, the local network file system examines cryptographic attributes associated with the file to determine if the file is encrypted or integrity-verified. If the local network file system determines that the cryptographic attributes indicate the file is encrypted, the local network file system omits the encryption of the file by the local network file system prior to passing the file to the remote network file system. If the local network file system determines that the cryptographic attributes indicate the file is integrity-verified, the local network file system omits the integrity verification of the file by the local network file system prior to passing the file to the remote network file system. The local network file system then transmits the file to the remote network file system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
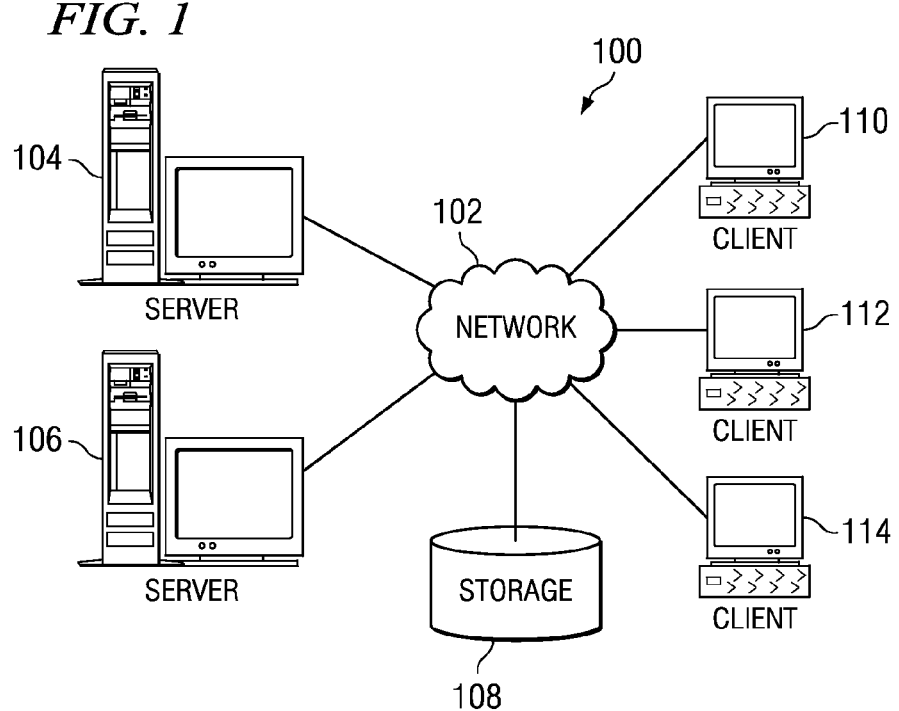
FIG. 1 depicts a pictorial representation of a distributed data processing system in which the illustrative embodiments may be implemented.
Figure 2:
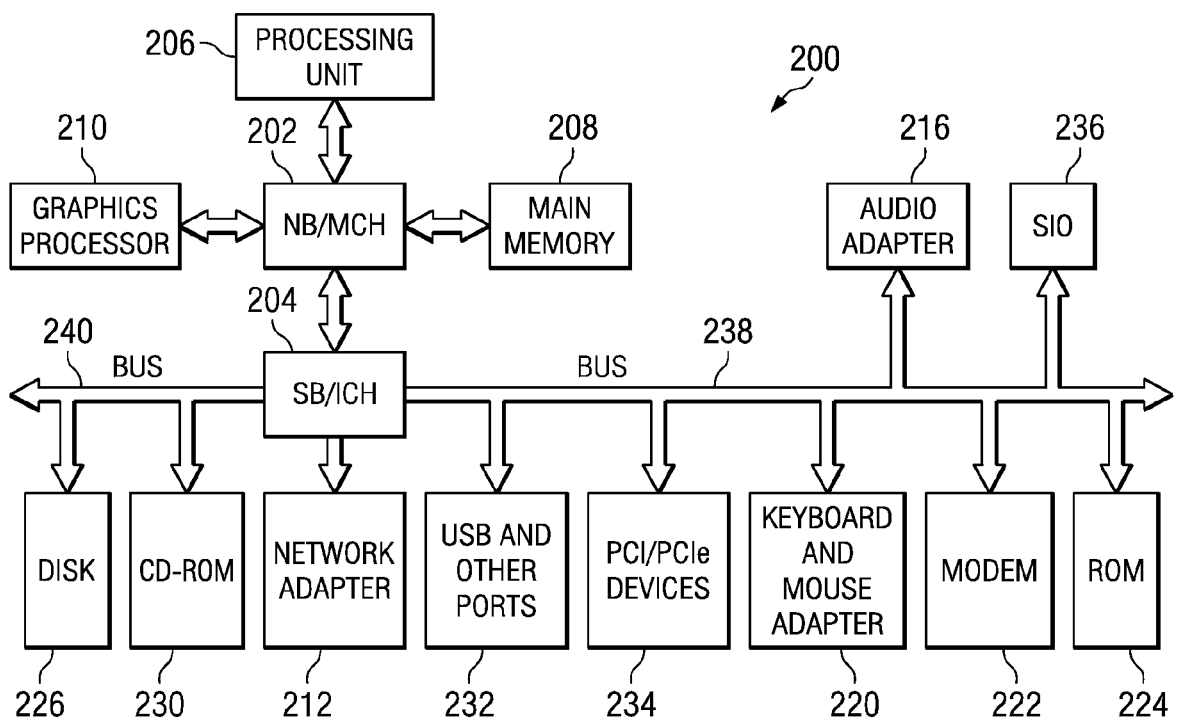
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, data processing system, and computer program product for providing transparent aware data transformation at the file system level to enable efficient encryption and integrity validation of network files. As previously mentioned, there are four key problems to address in stacking an encryption layer on top of existing network file systems. The illustrative embodiments address the identified problem of having the cryptographic file system detect and use a more optimal performance configuration when transferring data over a network file system. The illustrative embodiments provide for optimizing cryptographic policy based on the attributes of the network file system underneath the cryptographic file system layer.

To optimize cryptographic policy, the cryptographic file system layer takes into account the attributes of the underlying network file system when storing the file on disk. The cryptographic file system layer adjusts the format of the file according to the network file system. These attributes may include, but are not limited to, latency, transmission unit size, and request ordering, as well as the extent size, the layout of the encrypted file data on disk, the cryptographic algorithm, and the integrity algorithm. Taking into account the attributes of the underlying network file system allows the encrypted data to be stored on-disk in a format that is compatible with the cryptographic layer. Using a compatible format in the cryptographic layer allows for minimizing the amount of data transformation the network file system must perform in order to transmit the data to a requesting client or server. For instance, if the data must be transformed from decrypted to encrypted form under the normal operation of the protocol, the transformation process may be entirely skipped if the data is already stored in the requisite encrypted form. Thus, since the data is stored in a format that is compatible with the stacked cryptographic file system, the network file system does not need to decrypt and integrity-verify the data when the data is read. Instead, the cryptographic file system layered over the network file system is used to decrypt and integrity-verify the data.

Figure 3A:
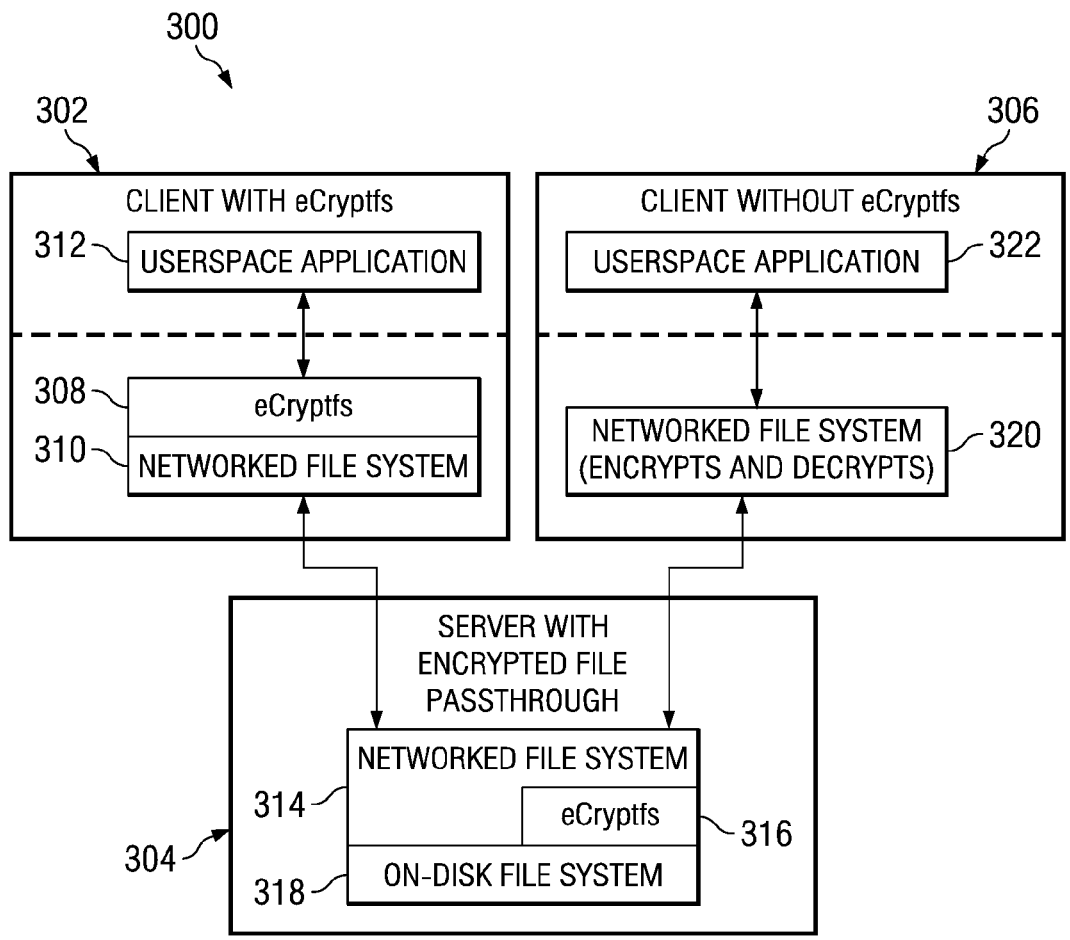
FIG. 3A is a block diagram illustrating an overview of an exemplary data processing system comprising cryptographic security in which the illustrative embodiments may be implemented.

FIG. 3A is a block diagram illustrating an overview of an exemplary data processing system comprising cryptographic security in which the illustrative embodiments may be implemented. In this illustrative example, data processing system 300 is shown to include a client comprising a cryptographic file system layer (client 302), a server with encrypted file passthrough (server 304), and client without a cryptographic file system layer (client 306).

Within client 302, cryptographic layer 308 is used to provide a virtual file system mounted over underlying network file system 310. Although any suitable cryptographic file system may be used with the illustrative embodiments, one particular example of cryptographic layer 308 is eCryptfs, which is a Linux cryptographic file system. Cryptographic layer 308 isolates the encryption functionality from the details of the physical file system. When encrypted data within network file system 310 is requested from a userspace application 312 within client 302, cryptographic layer 308 may decrypt the data and provide the decrypted data to the requesting application.

When creating a new file within network file system 310, cryptographic layer 308 above network file system 310 selects a format for on-disk storage within network file system 310, such that the work done by network file system 310 is minimized while providing optimal performance and security. In order to select such a storage format, cryptographic layer 308 queries network file system 310 for various attributes of the file system. These attributes may include the maximum transmission unit (MTU) size or the packet size, the encryption cipher used, the key size, the cipher block chaining mode used, a mapping of various cryptographic attribute descriptors to octet ranges and codes, or the integrity verification mechanism (i.e., hash type for HMAC). MTU is the largest amount of data packed into any single data packet. An encryption cipher is an encryption method, of which AES-128 is one example. The key size is the size of the key. The cipher block chaining mode specifies how sequential blocks are chained together. The hash type specifies the algorithm use to generate hash/digest value (many-to-one-mapping).

Several mechanisms may be employed to communicate this attribute information between underlying network file system 310 and stacked cryptographic layer 308. For instance, network file system 310 may fill in pseudo-xattr values in the file objects, or the kernel virtual file system (VFS) may provide an application programming interface (API), such as a kernel crypto API, to enable file systems to communicate information among themselves.

Given this attribute information, cryptographic layer 308 encrypts, integrity-protects, and arranges the data based on the attribute information. In this manner, cryptographic layer 308 writes data to underlying network file system 310 based on the attribute information such that the network file system would require a minimal amount of additional data transformation in order to transmit the data to the server.

In this example, server 304 is shown to comprise network file system 314, cryptographic file system 316, and on-disk file system 318. Network file system 314 may be stacked on underlying on-disk file system 318. Cryptographic file system 316 may be used to encrypt data when unencrypted data is passed up the stack from the on-disk file system 316 to network file system 314. When encrypted data is received by network file system 314, cryptographic file system 316 may also write the data to on-disk file system 316 encrypted, or decrypt the data prior to writing the data out to on-disk file system 316. Cryptographic file system 316 may also be used to provide data integrity via data signing, which prevents unauthorized modification of the data.

Within client 306, no cryptographic layer is provided. Thus, network file system 320 provides the encryption and decryption of data stored in the file system. When encrypted data within network file system 320 is requested from a userspace application 322 within client 306, network file system 320 decrypts the data and provides the decrypted data to the requesting application.

To illustrate how using a compatible format in the cryptographic layer allows for minimizing the amount of data transformation a network file system must perform in order to transmit the data to a requesting client or server, various examples are provided. For instance, in one example, client 302 transmits data to requesting client 306. Thus, in this example, underlying network file system 310 in client 302 provides data to a remote network file system 320 in client 306. In client 302, the data being transmitted has already traversed through encryption layer 308, such as when userspace application 312 writes the data to 'disk', or network file system 310. Since the data already passed through encryption layer 308, the data is already safely encrypted before network file system 310 transmits the data through an untrusted domain. In this situation, network file system 310 may pass the encrypted data through to server 304 as-is, without performing any further encryption. Likewise, since the data already passed through encryption layer 308, the data may already be integrity-verified before network file system 310 transmits the data. In this situation, network file system 310 may pass the data through to server 304 as-is, without performing any further integrity validation. Thus, data may be passed to server 304 without the need for revalidating the integrity of the data since the data is already signed (validated).

Once the encrypted data reaches server 304, network file system 314 on server 304 stores the encrypted data in the server's on-disk file system 318. Cryptographic attributes may be inserted into the header of the data in order to communicate to the receiving network file system that the file is already encrypted and/or signed (integrity-verified). Thus, a receiving network file system such as the server's on-disk file system 318 may determine from the cryptographic attributes that no cryptographic operations or integrity verification of the received data is needed. At a future time, when another network file system wants to read data from network file system 310, the server need only read the encrypted and integrity-protected data from network file system 310 and perform the minimal amount of work necessary to transmit the data to the requesting client.

Various mechanisms may be used for obtaining the cryptographic attributes which indicate that the file is encrypted or signed. One such mechanism, inode metadata, may provide an "extended attribute" in the data header containing the information to indicate whether the file is encrypted (and the encryption mechanism used) or signed. A flag may be used in the inode metadata to indicate that the file is already encrypted or integrity-verified. Another mechanism, inode data, provides data which begins with cryptographic information that indicates whether (and optionally, how the is mechanism used) the file is encrypted or signed. A third mechanism for obtaining cryptographic information uses a different file that contains a list of the encrypted files. For example, each directory may contain a file named ".encrypted_files" which lists the files which are encrypted (and optionally, the encryption mechanism used). A fourth mechanism uses a shared policy (shared between client and server) which indicates the files (e.g., all files with a certain extension, a certain minimum size, or a certain filename pattern) that are encrypted or signed.

When server 304 provides the requested data to client 306, network file system 314 on server 304 determines that the requested data stored in on-disk file system 318 is already encrypted. Since network file system 314 detects that the data has already been encrypted (by encryption layer 308 in client 302), network file system 314 does not need to perform an encryption step. Consequently, server 304 may pass the encrypted data through to client 306.

Receiving-side client 306 does not need a cryptographic layer. Client 306 may receive the requested (and encrypted) data at network file system 320. Network file system 320 uses the cryptographic attributes in the header of the data to determine not to decrypt the data, but rather the encrypted data should be written to network file system 320 as-is. Network file system 320 may then decrypt the requested data when providing the requested data to userspace application 322.

In contrast, since client 306 does not contain a cryptographic layer, network file system 320 must perform the encryption of the data prior to sending requested data to server 304. However, once server 304 receives the encrypted data, server 304 may pass the data through to cryptographic layer 316 in its encrypted state. Cryptographic layer 316 may either write the data out to on-disk file system 318 encrypted, or cryptographic layer 316 may decrypt the data prior to writing out to on-disk file system 318. The next time another network file system client such as network file system 310 on client 302 requests the data, server 304 may just pass along the encrypted data stored in on-disk file system 316 to requesting network file system 310 in client 302. Cryptographic layer 308 may then decrypt and integrity-verify the data before passing it to userspace application 312.

Figure 3B:
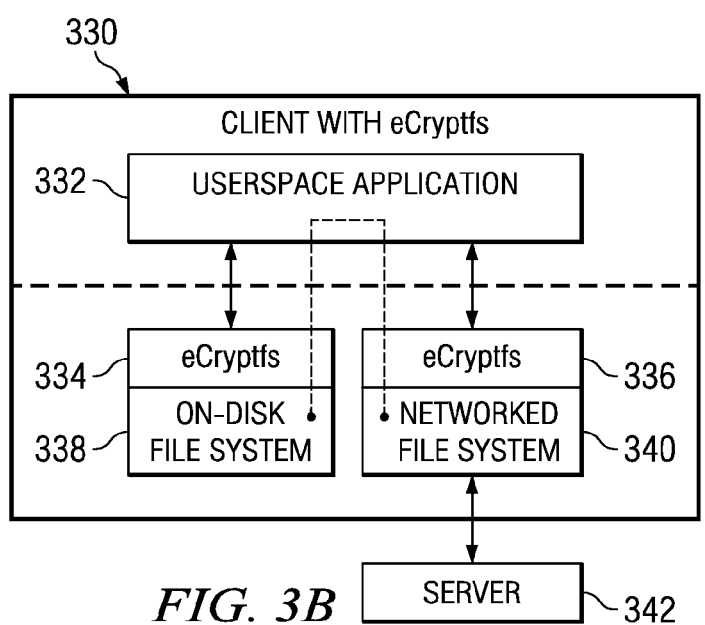
FIG. 3B is a block diagram illustrating an exemplary client cryptographic file system passthrough implementation in accordance with the illustrative embodiments.

FIG. 3B is a block diagram illustrating an exemplary client cryptographic file system passthrough implementation in accordance with the illustrative embodiments. This particular example illustrates how a file may be copied from an on-disk file system to a server, with no cryptographic operations being performed.

Client 330 comprises userspace application 332, encryption layers 334 and 336, on-disk file system 338, and network file system 340. In this example, userspace application 332 copies a file (represented by a circle) from the local on-disk file system 338 onto server 342. The file is already encrypted in on-disk file system 338 in client 330. Based on cryptographic attributes in the file header, cryptographic layers 334 and 336 determine that the file should be passed through userspace application 332 to network file system 340. In this manner, where data is simply copied from a local on-disk file system to a server on the network, the data being transmitted remains in its original encrypted and integrity-protected format throughout the entire process, with no cryptographic operations being performed. Server 342 then stores the encrypted data in its encrypted form. The process is the same when data is copied from server 342 to on-disk file system 338 on client 330. Thus, in contrast with existing systems which would require that the file be needlessly encrypted and decrypted multiple times in this example, the control logic in the illustrative embodiments allow such a file to be copied without performing cryptographic operations.

Figure 4:
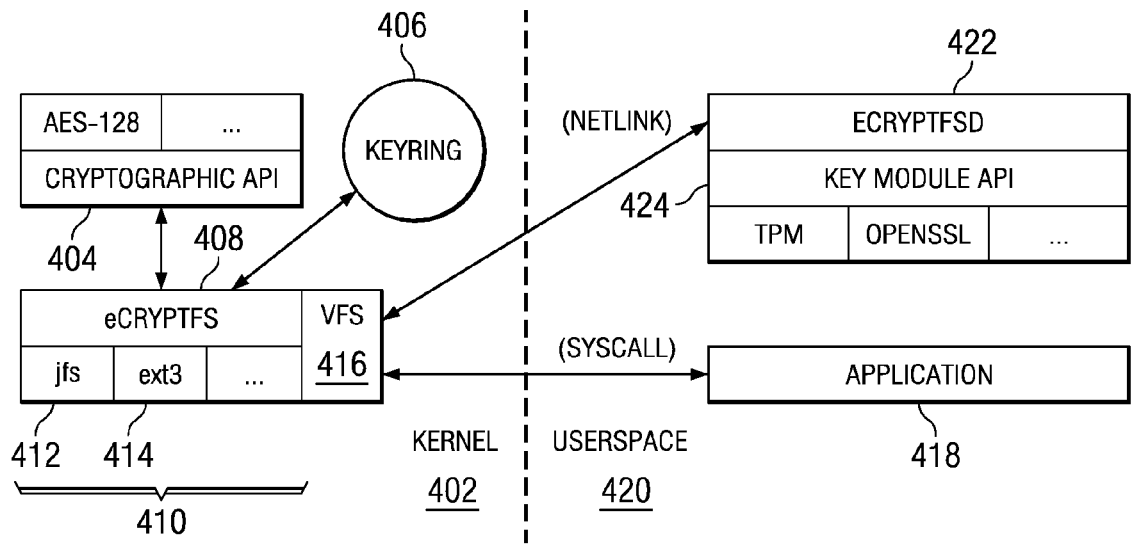
FIG. 4 is a block diagram illustrating an exemplary client cryptographic file system implementation in accordance with the illustrative embodiments.

FIG. 4 is a block diagram illustrating an exemplary client cryptographic file system implementation in accordance with the illustrative embodiments. Kernel space 402 is shown to comprise crypto API 404, keyring 406, and cryptographic layer 408. Cryptographic layer 408 is an example of cryptographic layer 308 in FIG. 3A. In this particular example, cryptographic layer 408 is an eCryptfs layer. Cryptographic layer 408 is stacked onto an underlying file system 410, such as JFS (journaled file system) 412 or ext3 (third extended file system) 414, among others. Cryptographic layer 408 provides a virtual file system (VFS) 416 to application 418 within userspace 420. Application 418 is an example of userspace application 312 in FIG. 3A.

Keyring 406 within kernel space 402 provides encryption keys to cryptographic layer 408.

Kernel space 402 is also shown to comprise crypto API 404. Crypto API 404 is an application programming interface which provides a mechanism for the cryptographic layer to make low-level encryption and decryption requests.

Userspace 420 comprises ecryptfsd 422. ecryptfsd 422 is the userspace daemon that handles key encryption and decryption requests from the eCryptfs kernel module. Key module API 424 provides an interface for custom key management modules (e.g., RSA or Trusted Platform Module (TPM)).

Figure 5:
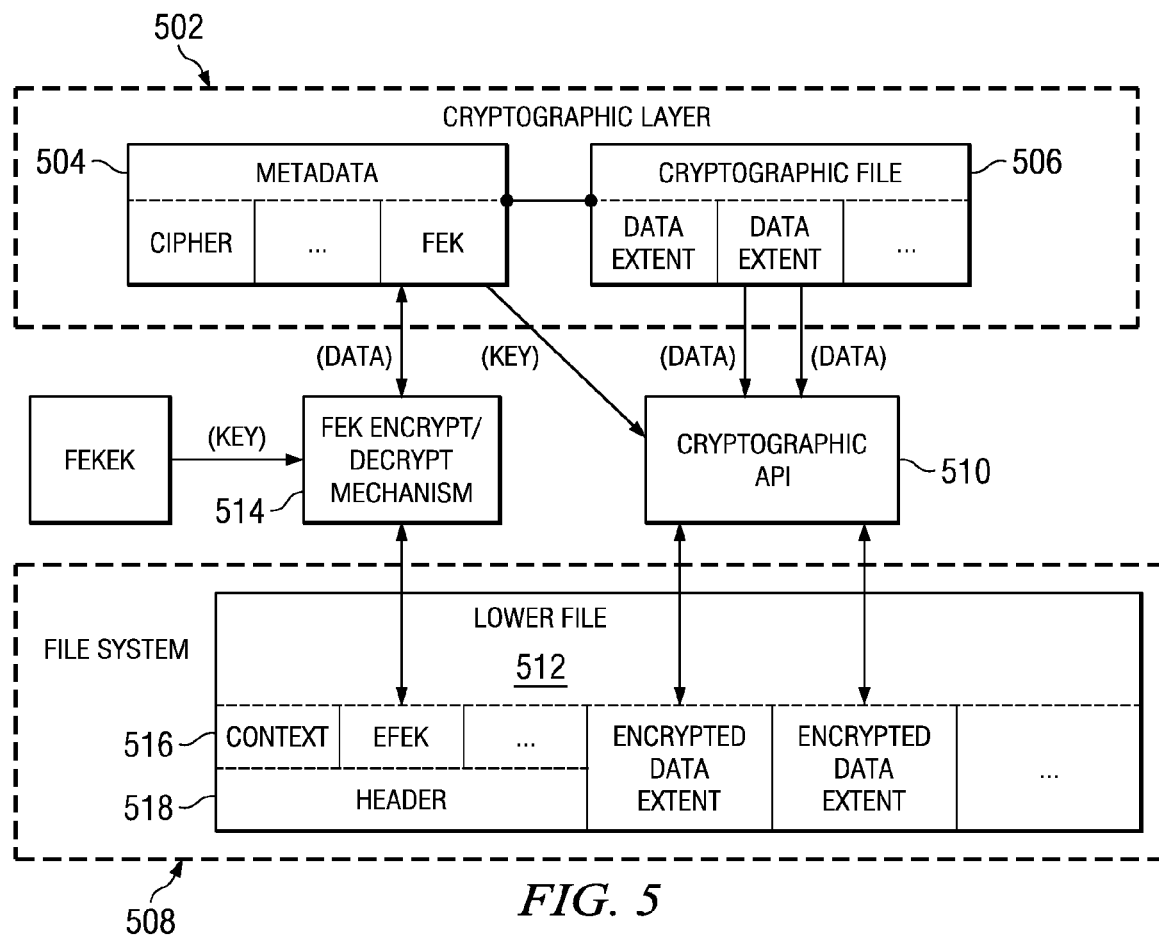
FIG. 5 is a block diagram illustrating an exemplary cryptographic layer and underlying file system in accordance with the illustrative embodiments.

FIG. 5 is a block diagram illustrating an exemplary cryptographic layer and underlying file system in accordance with the illustrative embodiments. Cryptographic layer 502 is an example of cryptographic layer 308 in FIG. 3A. Cryptographic layer 502 is shown to comprise metadata 504 and cryptographic file 506. Metadata 504 is where the cryptographic attributes are stored. Metadata 504 may be provided as header information generated by the network file system.

File system 508 is an example of network file system 310 in FIG. 3A. In this illustrative example, cryptographic layer 502 uses Crypto API 510 to obtain attribute information about file system 508. Crypto API 510 obtains the attribute information by querying the encrypted data extent attributes in lower file 512, and providing these attributes to cryptographic file 506. Cryptographic layer 502 may then use this attribute information in cryptographic file 506 to select a format for storing encrypted data in file system 508 based on these attributes of file system 508.

Cryptographic layer 502 also uses file encryption key (FEK) encryption/decryption mechanism 514 to encrypt and decrypt data according to the selected format. For instance, when a new file is created, cryptographic layer 502 may encrypt and arrange the data in a data format that is consistent with the attributes of file system 508.

Cryptographic attributes (context) 516 may also be set in header 518 of the data in order to communicate to file system 508 not to perform any cryptographic operations or transform the data. When the data is later read from file system 508, file system 508 would know not to transform the data. Instead, file system 508 would perform the minimal amount of work necessary to pass the data up to stacked cryptographic layer 502. Cryptographic layer 502 may then decrypt and integrity-verify the data using FEK encryption/decryption mechanism 514 before passing it to a requesting user application.

Figure 6:
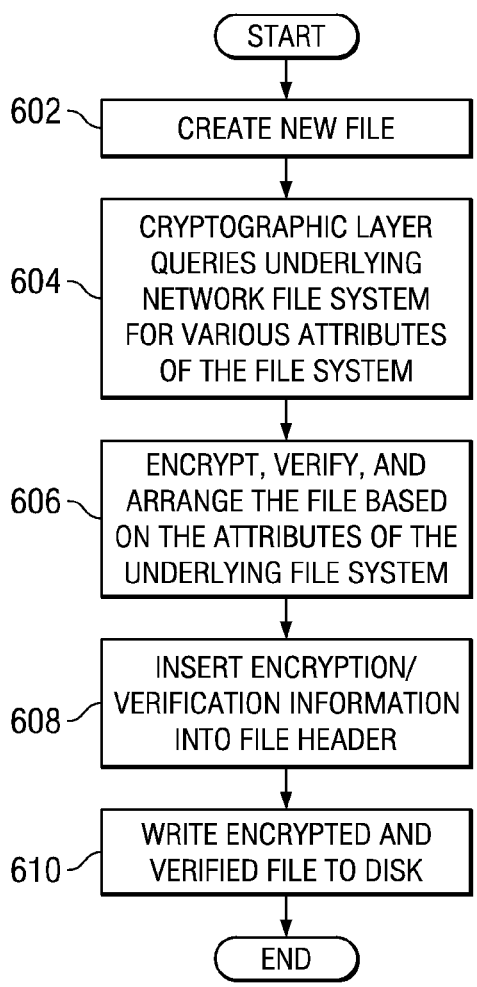
FIG. 6 is a flowchart of a process for providing transparent aware data transformation at the file system level in accordance with the illustrative embodiments.

FIG. 6 is a flowchart of a process for providing transparent aware data transformation at the file system level in accordance with the illustrative embodiments. The process described in FIG. 6 may be implemented in a data processing system, such as data processing system 300 in FIG. 3A. In particular, the process may be performed by a client which comprises a cryptographic layer, such as client 302 in FIG. 3A.

The process begins when a new file is created (step 602). The cryptographic file system layered above a network file system in the client queries the network file system for various attributes of the file system (step 604). In one embodiment, the network file system may communicate the attribute information to the cryptographic layer by filling in pseudo-xattr values in the file object. Alternatively, an API may be provided to allow the cryptographic file system and the network file system to communicate information between each other.

Once the attribute information is obtained, the cryptographic file system encrypts, verifies, and arranges the new file based on the attributes of the underlying file system (step 606). The cryptographic file system may also insert cryptographic attributes into the header of the file which may, when the file is requested from a remote network file system, inform the network file system that the file does not need to be encrypted and/or integrity-verified before transmitting the file to the requesting client (step 608). The cryptographic file system then writes the encrypted and verified file to disk (step 610).

Figure 7:
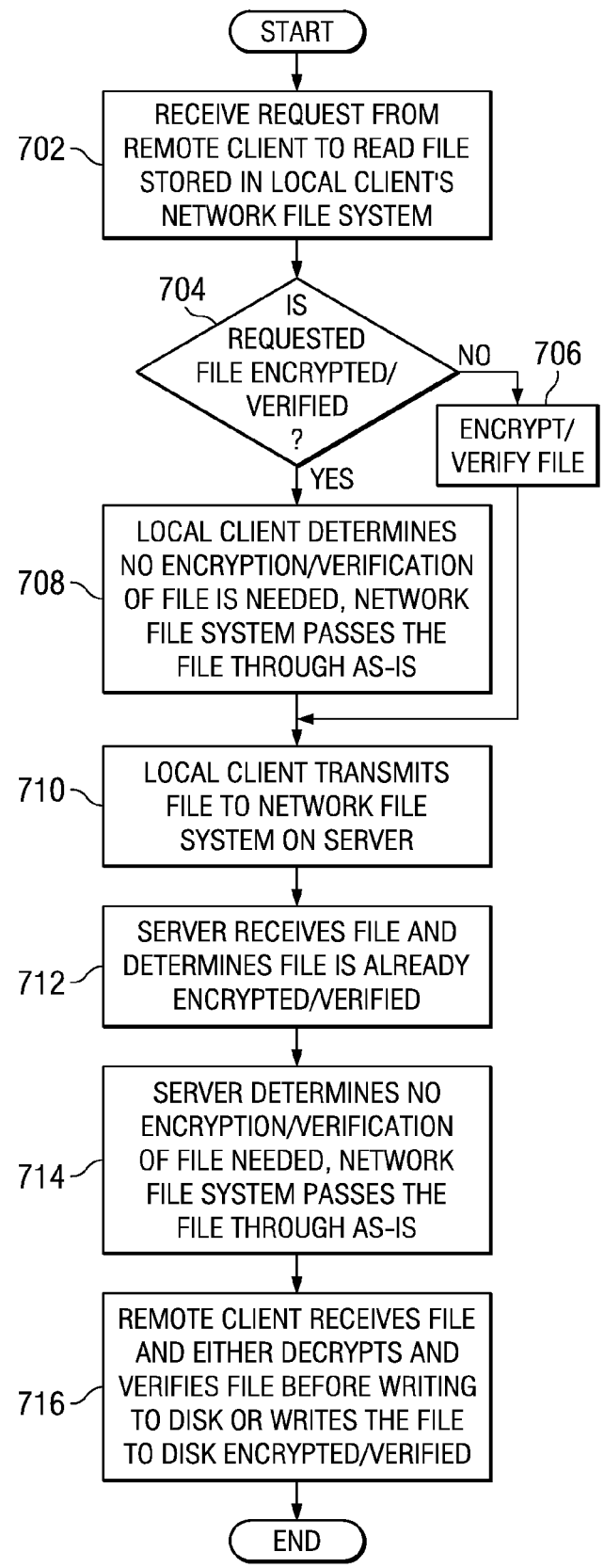
FIG. 7 is a flowchart of a process for providing data in a file system to a requesting client in accordance with the illustrative embodiments.

FIG. 7 is a flowchart of a process for providing data in a file system to a requesting client in accordance with the illustrative embodiments. The process described in FIG. 7 may be implemented in a data processing system, such as data processing system 300 in FIG. 3A. While this exemplary process describes a data privacy process in which a network file system may pass encrypted data without performing cryptographic operations on the data, it should be noted that this exemplary process is also applicable to a data integrity process in which a network file system may pass the data without performing integrity verification operations on the data if the network file system determines that the data is already signed (verified).

The process begins by receiving a request from a remote client to read a file stored in a network file system on the local client (step 702). Upon receiving the request, the network file system determines if the requested file is already encrypted and/or integrity-verified (step 704). This determination may be made by examining the header of the file to determine if the header contains a cryptographic attribute indicating that encryption and/or verification of the file is not needed. If the header of the file indicates that the requested file is not encrypted and/or verified ('no' output of step 704), the network file system (or the cryptographic layer of the client if the client contains a cryptographic layer) encrypts and/or verifies the file (step 706), with the process continuing to step 710.

Turning back to step 704, if the header of the file indicates that requested file is already encrypted and/or verified ('yes' output of step 704), no encryption and/or verification of the requested file needs to be performed by the network file system, and the network file system on the local client may pass the file through as-is (step 708). The local client then transmits the encrypted and/or verified file to the network file system on the server (step 710).

When the requested file is received at the server, the network file system examines the header in the file to determine that the file is already encrypted and/or integrity-verified (step 712). Since the file is already encrypted and/or verified, the server may skip the encryption and/or verification process for the file and pass the file through to the remote client (step 714).

When the requested file is received at the remote client, the cryptographic file system or the network file system on the remote client may then either write the file to the remote client's on-disk file system encrypted and verified, or the network file system may decrypt and integrity-verify the file before writing the file to the remote client's on-disk file system (step 716).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a network file, the computer implemented method comprising:
    receiving, at a local network file system, a request from a remote network file system to read a file stored in the local network file system;
    examining cryptographic attributes associated with the file to determine if the file is at least one of encrypted or integrity-verified;
    responsive to a determination that the cryptographic attributes indicates the file is encrypted, omitting the encryption of the file by the local network file system prior to passing the file to a remote network file system;
    responsive to a determination that the cryptographic attributes indicates the file is integrity-verified, omitting integrity-verification of the file by the local network file system prior to passing the file to the remote network file system; and
    transmitting the file to the remote network file system.

2. The computer implemented method of claim 1, further comprising:
    responsive to creating the file, using a cryptographic file system layered above the local network file system to query for attributes of the local network file system;
    encrypting or integrity-verifying the file based on the attributes of the local network file system;
    inserting cryptographic attributes into a header of the file, wherein the cryptographic attributes indicate whether the file is encrypted or integrity-verified; and
    writing the file to the local network file system.

3. The computer implemented method of claim 2, wherein the local network file system communicates the attributes to the cryptographic file system by filling in pseudo-xattr values in the file.

4. The computer implemented method of claim 2, wherein the local network file system communicates the attributes to the cryptographic file system using an application programming interface.

5. The computer implemented method of claim 1, wherein upon receiving the file, the remote network file system does not decrypt the file if the remote network file system determines the file is already encrypted.

6. The computer implemented method of claim 5, wherein the remote network file system decrypts the file before passing the file to an application.

7. The computer implemented method of claim 1, wherein upon receiving the file, the remote network file system does not integrity-verify the file if the remote network file system determines the file is already verified.

8. The computer implemented method of claim 1, wherein a client comprising the remote network file system does not contain a cryptographic file system.

9. The computer implemented method of claim 2, wherein the attributes of the local network file system include at least one of a maximum transmission unit size, an encryption cipher used, a key size, a cipher block chaining mode used, a mapping of various cryptographic attribute descriptors to octet ranges and codes, or an integrity verification mechanism used.

10. The computer implemented method of claim 1, wherein the cryptographic attributes are located in one of inode metadata, inode data, an encrypted file list file, or a shared policy.

11. A data processing system for managing a network file, the data processing system comprising:
    a bus;
    a storage device connected to the bus, wherein the storage device contains computer usable code;
    at least one managed device connected to the bus;
    a communications unit connected to the bus; and
    a processing unit connected to the bus, wherein the processing unit executes the computer usable code to receive, at a local network file system, a request from a remote network file system to read a file stored in the local network file system; examine cryptographic attributes associated with the file to determine if the file is at least one of encrypted or integrity-verified; omit the encryption of the file by the local network file system prior to passing the file to a remote network file system in response to a determination that the cryptographic attributes indicates the file is encrypted; omit integrity-verification of the file by the local network file system prior to passing the file to the remote network file system in response to a determination that the cryptographic attributes indicates the file is integrity-verified; and transmit the file to the remote network file system.

12. The data processing system of claim 11, wherein the processing unit further executes the computer usable code to use a cryptographic file system layered above the local network file system to query for attributes of the local network file system in response to creating the file; encrypt or integrity-verify the file based on the attributes of the local network file system; insert cryptographic attributes into a header of the file, wherein the cryptographic attributes indicate whether the file is encrypted or integrity-verified; and write the file to the local network file system.

13. A computer program product for managing a network file, the computer program product comprising:
   a computer usable medium having computer usable program code tangibly embodied thereon, the computer usable program code comprising:
   computer usable program code for receiving, at a local network file system, a request from a remote network file system to read a file stored in the local network file system;
   computer usable program code for examining cryptographic attributes associated with the file to determine if the file is at least one of encrypted or integrity-verified;
   computer usable program code for omitting the encryption of the file by the local network file system prior to passing the file to a remote network file system in response to a determination that the cryptographic attributes indicates the file is encrypted;
   computer usable program code for omitting integrity verification of the file by the local network file system prior to passing the file to the remote network file system in response to a determination that the cryptographic attributes indicates the file is integrity-verified; and
   computer usable program code for transmitting the file to the remote network file system.

14. The computer program product of claim 13, further comprising:
   computer usable program code for using, in response to creating the file, a cryptographic file system layered above the local network file system to query for attributes of the local network file system;
   computer usable program code for encrypting or integrity-verifying the file based on the attributes of the local network file system;
   computer usable program code for inserting cryptographic attributes into a header of the file, wherein the cryptographic attributes indicate whether the file is encrypted or integrity-verified; and
   computer usable program code for writing the file to the local network file system.

15. The computer program product of claim 14, wherein the local network file system communicates the attributes to the cryptographic file system by filling in pseudo-xattr values in the file.

16. The computer program product of claim 14, wherein the local network file system communicates the attributes to the cryptographic file system using an application programming interface.

17. The computer program product of claim 13, wherein upon receiving the file, the remote network file system does not decrypt the file if the remote network file system determines the file is already encrypted.

18. The computer program product of claim 13, wherein the remote network file system decrypts the file before passing the file to an application.

19. The computer program product of claim 13, wherein upon receiving the file, the remote network file system does not integrity-verify the file if the remote network file system determines the file is already verified.

20. The computer program product of claim 14, wherein the attributes of the local network file system include at least one of a maximum transmission unit size, an encryption cipher used, a key size, a cipher block chaining mode used, a mapping of various cryptographic attribute descriptors to octet ranges and codes, or an integrity verification mechanism used, and wherein the cryptographic attributes are located in one of inode metadata, inode data, an encrypted file list file, or a shared policy.

* * * * *